United States Patent [19]

Valko

[11] Patent Number: 5,250,164

[45] Date of Patent: Oct. 5, 1993

[54] BETA-HYDROXY URETHANE LOW TEMPERATURE CURING AGENTS

[75] Inventor: Joseph T. Valko, Pittsburgh, Pa.

[73] Assignee: PPG Industries, Inc., Pittsburgh, Pa.

[21] Appl. No.: 954,591

[22] Filed: Sep. 28, 1992

Related U.S. Application Data

[60] Continuation of Ser. No. 818,739, Jan. 7, 1992, abandoned, which is a continuation of Ser. No. 315,954, Feb. 27, 1989, abandoned, which is a continuation of Ser. No. 941,919, Dec. 15, 1986, abandoned, which is a continuation of Ser. No. 531,105, Sep. 12, 1983, abandoned, which is a division of Ser. No. 409,273, Aug. 18, 1982, Pat. No. 4,435,559.

[51] Int. Cl.$^5$ .............................................. C25D 13/04
[52] U.S. Cl. ............................. 204/181.7; 528/45; 528/73; 427/372.2; 427/384; 427/385.5; 427/386; 427/388.1; 427/388.2; 427/388.3
[58] Field of Search .............. 204/181.7; 528/45, 73; 427/372.2, 384, 385.5, 386, 388.1, 388.2, 388.3

[56] References Cited

U.S. PATENT DOCUMENTS

| | | | |
|---|---|---|---|
| 3,360,504 | 12/1967 | Kelley | 260/79.7 |
| 4,096,291 | 6/1978 | Dunwald et al. | 427/120 |
| 4,147,679 | 4/1979 | Saiven | 204/181.7 |
| 4,285,789 | 8/1981 | Kobayashi | 204/181.7 |
| 4,528,363 | 7/1985 | Tominaga | 528/370 |
| 4,543,376 | 9/1985 | Schupp | 204/181.7 |

FOREIGN PATENT DOCUMENTS 1531046  11/1978  United Kingdom ............. 204/181.7

OTHER PUBLICATIONS

J. Am. Chem. Soc., 79, pp. 672-675.

Primary Examiner—John Niebling
Assistant Examiner—Kishor Mayekar
Attorney, Agent, or Firm—William J. Uhl

[57] ABSTRACT

A curable composition, comprising a beta-hydroxy urethane which is particularly useful as a crosslinking agent which affords relatively low temperature cure, is provided.

4 Claims, No Drawings

//5,250,164

BETA-HYDROXY URETHANE LOW TEMPERATURE CURING AGENTS

This application is a continuation of application Ser. No. 07/818,739, filed Jan. 7, 1992, abandoned, which is a continuation of application Ser. No. 07/315,954, filed Feb. 27, 1989, abandoned, which is a continuation of application Ser. No. 06/941,919, filed Dec. 15, 1986, abandoned, which is a continuation of application Ser. No. 06/531,105, filed Sep. 12, 1983, abandoned, which is a division of application Ser. No. 06/409,273, filed Aug. 18, 1982, now issued as U.S. Pat. No. 4,435,559.

BACKGROUND OF THE INVENTION

Field of the Invention: The present invention relates to curable compositions, the methods of making and using same, particularly in cationic electrodepositable compositions. More specifically, the present invention relates to curable compositions comprising blocked isocyanate crosslinking agents.

Brief Description of the Prior Art: Curable compositions containing blocked isocyanate crosslinking agents are known in the art. These compositions cure at temperatures of about 350° F. over a period of 20 to 30 minutes. With the advent of energy conservation, however, lower temperature cure has been desirable. Hence, much work has been done to formulate curable compositions that cure effectively at relatively lower temperatures.

As is the case here, much work has been done in developing blocked isocyanate crosslinking agents which would aid in effecting lower temperature cure. Consequently, it has been found that proper selection of blocking agents for isocyanato groups of these crosslinking agents results in the formation of crosslinking agents that effect cure at relatively lower temperatures. By the present invention, novel compositions comprising crosslinking agents which can effect cure at relatively lower temperatures have been provided.

SUMMARY OF THE INVENTION

In accordance with the foregoing, the present invention relates to an ungelled curable composition comprising:
(i) an active hydrogen-containing material,
(ii) a beta-hydroxy urethane, and
(iii) a cure catalyst.

The present invention also encompasses a method of providing a decorative or protective coating for substrates, particularly by electrodeposition. The process comprises:
(1) applying to the substrate a coating composition comprising:
  (a) a beta-hydroxy urethane,
  (b) a cure catalyst, and optionally
  (c) an active hydrogen-containing material.

By the term "beta-hydroxy" urethane is meant that the urethane has a hydroxyl group which is in the beta position relative to the carbamoxy group.

The beta-hydroxy urethane has been found to be useful as a crosslinking agent for curable compositions, particularly coating compositions. Alternately, the beta-hydroxy urethane can be used as a self-crosslinkable material in providing protective and/or decorative coatings. A clear advantage of the preferred compositions comprising the beta-hydroxy urethane resides in their ability to effect cure at relatively lower temperatures, i.e., below 350° F..

DETAILED DESCRIPTION OF THE INVENTION

The active hydrogen-containing materials have as the active hydrogen group a member selected from the group consisting of hydroxyl, primary amine, secondary amine (including imine), thiol and the like. The active hydrogen-containing materials useful herein are typically filmforming compositions. Also, they can be molding or laminating compositions. Illustrative examples of active hydrogen-containing materials are polymers such as epoxy polymers, acrylic polymers, polyesters, and the like, which contain active hydrogen groups. Particularly preferred active hydrogen-containing materials are those prepared from epoxy materials.

The useful epoxy materials can be monomeric or polymeric compounds or mixture of compounds having an average of one or more epoxy groups per molecule. Although monoepoxides can be utilized, it is preferred that the epoxy materials contain more than one epoxy group per molecule. The epoxy materials can be essentially any of the well-known epoxides. A particularly useful of polyepoxides are polyglycidyl ethers of polyphenols such as bisphenol A. These can be produced, for example, by etherification of a polyphenol with epichlorohydrin or dichlorohydrin in the presence of an alkali. The phenolic compound may be, for example, bis(4-hydroxyphenyl)2,2-propane, 4,4'-dihydroxybenzophenone, bis(4-hydroxyphenyl)1,1-ethane, bis(4-hydroxyphenyl)1,1-isobutane, bis(4-hydroxytertiarybutylphenyl)2,2-propane, bis(2-hydroxynaphthyl)methane, 1,5-dihydroxynaphthylene, or the like. In many instances it is desirable to employ such polyepoxides having somewhat higher molecular weight and containing aromatic groups. These can be provided by reacting the diglycidyl ether above with a polyphenol such as bisphenol A. Preferably the polyglycidyl ether of a polyphenol contains free hydroxyl groups in addition to epoxide groups.

While the polyglycidyl ethers of polyphenols may be employed per se, it is frequently desirable to react a portion of the reactive sites (hydroxyl or in some instances epoxy) with a modifying material to vary the film characteristics of the resin.

Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl)2,2-propane and the like. There can also be used polyglycidyl esters of polycarboxylic acids, which are produced by the reaction of epichlorohydrin or similar epoxy compounds with an aliphatic or aromatic polycarboxylic acid such as oxalic acid, succinic acid, glutaric acid, terephthalic acid, 2,6-naphthylene dicarboxylic acid, dimerized linolenic acid and the like. Examples are glycidyl adipate and glycidyl phthalate. Also useful are polyepoxides derived from the epoxidation of an olefinically unsaturated alicyclic compound. Included are diepoxides comprising in part one or more monoepoxides. These polyepoxides are non-phenolic and are obtained by the epoxidation of alicyclic olefins. For example, by oxygen and selected metal catalysts, by perbenzoic acids, by acetaldehyde monoperacetate, or by peracetic acid. Among such polyepoxides are the epoxy alicyclic ethers and esters which are well-known in the art.

Other epoxy-containing compounds and resins include nitrogeneous diepoxides such as disclosed in U.S. Pat. No. 3,365,471; epoxy resins from 1,1-methylene bis(5-substituted hydantoin), U.S. Pat. No. 3,391,097; bisimide containing diepoxides, U.S. Pat. No. 3,450,711, epoxylated aminoethyldiphenyl oxides, U.S. Pat. No.3,312,664; heterocyclic N,N'-diglycidyl compounds, U.S. Pat. No. 3,503,979; amino epoxy phosphonates, British Pat. No. 1,172,916; 1,3,5,-triglycidyl isocyanurates, as well as other epoxy-containing materials known in the art.

An aqueous dispersion of the active hydrogen group containing epoxy polymer is prepared by providing the polymer with a water-solubilizing group. Preferably, the water-solubilizing group is a cationic group such as an amine salt or an onium group such as quaternary ammonium base group. The amine salts, for example, can be prepared by reacting the epoxy polymer with a primary or secondary amine, followed by neutralizing the resulting amine adduct with an acid. Alternately, a preformed acid salt of the amine, i.e., primary, secondary or tertiary amine salt, can be reacted with the epoxy polymer.

The beta-hydroxy urethane can be prepared by reacting (i.e., blocking) an isocyanato compound or polymer (hereinafter "isocyanate") with a 1,2-polyol or with a combination of a 1,2-polyol and a conventional blocking agent. In this context, the term "1,2-polyol" denotes a compound containing at least two vicinal hydroxyl groups. The term "conventional blocking agent" denotes a compound which reacts with an isocyanate to form a blocked isocyanate crosslinking agent which does not effect appreciable cure below 350° F.

The isocyanates useful herein can be monoisocyanates or polyisocyanates. Illustrative of the monoisocyanates are ethylenically unsaturated polymerizable monomers containing an isocyanato group. Illustrative of these monoisocyanates are isocyanato alkyl esters of ethylenically unsaturated carboxylic acids such as vinyl isocyanates, allyl isocyanates, allyloxyalkyl isocyanates and styryl isocyanates. Representative examples are 2-isocyanato ethyl acrylate, 2-isocyanato ethyl methacrylate, propenyl isocyanate, and 9-decenyl isocyanate.

The polyisocyanates useful herein can be aliphatic or aromatic isocyanates, with the aromatic isocyanates being preferred. Representative examples are the aliphatic isocyanates such as trimethylene, tetramethylene, pentamethylene, hexamethylene, 1,2-propylene, 1,2-butylene, 2,3-butylene, and 1,3-butylene diisocyanates; the cycloalkylene compounds such as 1,3-cyclopentane, 1,4-cyclohexane, 1,2-cyclohexane diisocyanates and isophorone diisocyanates; the aromatic compounds such as m-phenylene, p-phenylene, 4,4'-diphenyl, 1,5-napthalene and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the nuclear-substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-dimethyldiphenyl methane-2,2',5,5'-tetraisocyanate; the polymerized polyisocyanates such as tolylene diisocyanate dimers and trimers, and the like.

In addition, the organic polyisocyanate may be a prepolymer derived from a polyol including polyether polyol or polyester polyol, including polyols which are reacted with excess polyisocyanates to form isocyanate-terminated prepolymers. These may be simple polyols such as glycols, e.g., ethylene glycol and propylene glycol, as well as other polyols such as glycerol, trimethylolpropane, hexanetriol, pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethyloethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

As afore-stated, in preparing the beta-hydroxy urethane, a 1,2-polyol or a combination of the 1,2-polyol and a conventional blocking agent is reacted with the isocyanate. Typically, the 1,2-polyols are of low molecular weight, ranging from about 62 to 286. Representative examples of the 1,2-polyols are ethylene glycol, 1,2-propylene glycol, 1,2-butanediol, 1,2-hexanediol and hydrolyzed butyl glycidyl ether. While higher molecular weight polyols are not generally used, they can be employed preferably in combination with the low molecular weight 1,2-polyols.

The conventional blocking agent in accordance with this invention can be aliphatic, cycloaliphatic or aromatic alkyl monoalcohol, for example, lower aliphatic alcohols, such as methyl, ethyl, chloroethyl, propyl, butyl, amyl, hexyl, heptyl, octyl, nonyl, 3,3,5-trimethylhexyl, decyl and lauryl alcohols and the like; cycloaliphatic alcohols such as cyclopentanol and cyclohexanol and aromatic alkyl such as phenyl carbinol.

In preparing the beta-hydroxy urethane as described herein, the isocyanate and the 1,2-polyol are reacted in such a proportion that no free, or virtually no free isocyanate groups are present in the resultant product. Preferably, they are reacted in such a proportion that the equivalent ratio of -OH of the 1,2-polyol to that of free -NCO group of the isocyanate is 2 to 1 and preferably 1.5 to 1.

When a conventional blocking agent is used in combination with the 1,2-polyol, the combination of blocking agents and the isocyanate is typically reacted in such a proportion that the conventional blocking agent is used in an amount which is not more than twice the amount of the 1,2-polyol.

To obtain the beta-hydroxy urethane, it is recommended that the isocyanate be added slowly to the 1,2-polyol or the combination thereof. Upon completion of the addition, the reaction mixture is allowed to react over a temperature range of 80° to 120° C., until all or virtually all of the free isocyanate is reacted.

A catalyst is usually employed in preparing the beta-hydroxy urethane. Catalysts useful herein are those suitable for urethane formation. They are, preferably, metal salts or complexes, for example, lead acetate, dibutyltin dilaurate, stannous octoate and the like. Other catalysts for urethane formation may also be employed.

A solvent is usually employed in preparing the beta-hydroxy urethane. Solvents that are non-reactive with isocyanates are preferred, e.g., ketones, e.g., methyl isobutyl ketone, ethers such as diethyl ether of ethylene glycols, or esters such as ethyl acetate.

The beta-hydroxy urethane can be external or internal as to the active hydrogen-containing material. By the term "external" herein is meant that the beta-hydroxy urethane does not constitute an integral part of the active hydrogen-containing material. By the term "internal" herein is meant the active hydrogen-containing material is an integral part of the active hydrogen-containing material.

As set forth herein, the curable composition comprises a cure catalyst. Typically, the cure catalyst is a metal salt and/or complex of a metal such as lead, zinc, iron, tin and manganese. Suitable salts of these metals are, for example, octoates and naphthanates. A suitable complex is, for example, acetyl acetonate. The cure catalyst is used in amounts sufficient to effect cure at the relatively low temperatures described herein. For example, the metal salt and/or complex is employed as a cure catalyst in amounts of about 0.1 to 2.0, preferably 0.2 to 1 percent metal by weight (solids) based on the weight of the curable composition. The cure catalyst can be mixed simultaneously with other starting materials for the preparation of the coating composition, or introduced into the coating composition in any order that is convenient.

In the practice of the invention, the curable compositions can be adapted for use in water-based or solvent-based coating compositions. Coating compositions comprising aqueous dispersions are particularly suited to application by electrodeposition, although they may be applied by conventional non-electrophoretic coating techniques. The term "dispersion" as used herein, is intended to cover solutions and colloidal suspensions, as well. Generally, the aqueous dispersion may contain from about 1 to 75 percent by weight resin.

In most instances, a pigment composition and, if desired, various additives such as anti-oxidants, surface-active agents, coupling solvents and the like known in the electrodeposition art are included. The pigment composition may be of any conventional type, comprising, for example, one or more pigments such as iron oxides, lead oxides, strontium chromate, carbon black, titanium dioxide, talc, barium sulfate, cadmium yellow, cadmium red, chromic yellow, or the like.

In electrodeposition processes employing the aqueous coating compositions described above, the aqueous composition is placed in contact with an electrically conductive anode and an electrically conductive cathode with the surface to be coated being the cathode.

Upon passage of electric current between the anode and the cathode, while in contact with the bath containing the coating composition, an adherent film of the coating composition is deposited on the cathode.

The conditions under which the electrodeposition is carried out are, in general, similar to those used in electrodeposition of other types of coatings. The applied voltage may be varied greatly and can be, for example, as low as one volt or as high as several thousand volts, although typically between 50 volts and 500 volts. The current density is usually between about 1.0 ampere and 15 amperes per square foot, and tends to decrease during electrodeposition. The method of the invention is applicable to the coating of any electrically conductive substrate, and especially metals such as steel, aluminum, copper or the like.

After deposition, the coating is cured at elevated temperatures by any convenient method such as in baking ovens or with banks of infrared heat lamps. Relatively low baking temperatures are employed in curing the films derived from the preferred embodiments of this invention. At temperatures as low as 250° F., appreciable cure is obtained. At temperatures of about 325° F., excellent cure is obtained. It has been found that the preferred embodiments of the invention which cure at the relatively lower temperatures are derived from aromatic isocyanates. Of course, cure can be obtained at higher temperatures of about 500° F. to 600° F.; however, it is a distinct feature of this invention that excellent cures are obtained at 325° F.

The particularly preferred crosslinking agents of this invention possess a desirable feature of imparting desirable film properties such as flow and surface smoothness. Illustrative examples of the preferred crosslinking agents are those comprising blocked isocyanates wherein the blocking agent is hydrolyzed butyl glycidyl ether. It is noteworthy that, in some instances, film properties can be improved by combining the 1,2-polyol blocking agents with conventional blocking agents which are known to impart these film properties.

This and other aspects of the invention are further illustrated by the following non-limiting examples.

EXAMPLES

In the following examples, the crosslinking agents were prepared, and in some of the examples they were blended with active hydrogen-containing materials so as to form curable compositions. The curable compositions were applied to substrates to form films which were baked and evaluated for their ability to cure at relatively low temperatures.

EXAMPLE IA

A crosslinking agent comprising a 1,2-polyol blocking agent was prepared as follows:

| Ingredients | Mass (gm) | Non-Volatiles (gm) | Equivalents | Moles |
|---|---|---|---|---|
| MONDUR TD80[1] | 391.3 | 391.3 | 4.497 | 2.249 |
| Trimethylolpropane | 100.4 | 100.4 | 2.248 | 0.749 |
| Methyl isobutyl ketone | 210.7 | | | |
| Methyl isobutyl ketone | 75.0 | | | |
| Hydrolyzed butyl glycidyl ether[2] | 475.0 | 316.1 | 4.273 | 2.136 |

-continued

| Ingredients | Mass (gm) | Non-Volatiles (gm) | Equivalents | Moles |
|---|---|---|---|---|
| Dibutyltin dilaurate | 0.12 | 0.12 | | |

[1] An 80/20 mixture of 2,4- and 2,6-toluene diisocyanate, marketed by Mobay Chemical Company.
[2] Obtained by hydrolysis with $HBF_4$ in aqueous acetone of n-butyl glycidyl ether, which is marketed by Shell Chemical Company. The hydrolyzed material was azeotropically dried with methyl isobutyl ketone and had the following characteristics: hydroxyl number of 504.7, epoxy equivalent of infinity and 0.12 percent $H_2O$.

A reaction vessel equipped with a stirrer, a thermometer, a gas inlet fitting, a condenser and an addition funnel was charged with the diisocyanate and a nitrogen blanket was begun. The trimethylolpropane was dissolved in the 210.7 grams of methyl isobutyl ketone with heating and charged to a warm addition funnel. The triol solution was added to the diisocyanate over 30 minutes while maintaining the temperature of the reaction mixture between 36° and 38° C. (with an ice bath as needed). After completion of the addition, the reaction mixture was stirred at ambient temperature for 45 minutes. During this time, a second reaction vessel equipped in the same manner as described above was charged with the 75.0 grams of methyl isobutyl ketone and the hydrolyzed butyl glycidyl ether. This mixture was heated to 62° C. The isocyanate-trimethylolpropane adduct solution was charged to the addition funnel and added to the mixture over one hour while maintaining the temperature between 63° and 67° C. The dibutyltin dilaurate was added to the resulting mixture and the temperature was increased to 121° C., followed by refluxing for about 2 hours. A sample of the reaction mixture was removed, analyzed by infrared spectroscopy and revealed no isocyanate peak.

The resultant product comprising the blocked isocyanate cross-linking agent had a solids content of 68.7 percent.

EXAMPLE IB

An active hydrogen group-containing material was prepared as follows.

| Ingredients | Mass (gm) | Non-Volatiles (gm) | Equivalents | Moles |
|---|---|---|---|---|
| EPON 828[1] | 910.6 | 910.6 | 4.844 | 2.422 |
| PCP-0200[2] | 320.4 | 320.4 | 1.211 | 0.605 |
| Xylene | 73.3 | | | |
| Bisphenol A | 281.6 | 281.6 | 2.470 | 1.235 |
| Benzyldimethylamine | 2.0 | | | |
| Benzyldimethylamine | 4.3 | | | |
| Diketimine derived from diethylene triamine and methyl isobutyl ketone | 98.5 | 74.5 | 0.28 | 0.28 |
| N-methylethanolamine | 70.0 | 70.0 | 0.93 | 0.93 |
| Methyl isobutyl ketone | 706.3 | | | |
| n-Butanol | 77.7 | | | |

[1] Epoxy resin made by reacting epichlorohydrin and bisphenol A having an epoxy equivalent of 188, commercially available from the Shell Chemical Company.
[2] Polycaprolactone diol having a molecular weight of about 529, available from Union Carbide Corporation.

The EPON 828, PCP-0200 and xylene were charged to a reaction vessel and heated under a nitrogen blanket to 210° C. The reaction was held at reflux for about ½ hour to remove water. The reaction mixture was cooled to about 155° C., followed by adding the bisphenol A and holding the reaction mixture for about ½ hour to dissolve the bisphenol A. Thereafter, at 151° C., there was added to the reaction mixture the 2.0 grams of benzyldimethylamine with a resulting exotherm and a temperature rise to 182° C. The reaction mixture was allowed to cool to 130° C., at which temperature, the 4.3 grams of the benzyldimethylamine catalyst was added and the resulting mixture held at 130° C. until a reduced Gardner-Holdt viscosity of P-Q was obtained. (Measured by using 50 percent non-volatile solution of a sample of the resulting mixture in ethylene glycol monoethyl ether.) The diketimine derivative and the N-methylethanolamine were then added and the temperature of the reaction mixture brought to 110° C. and held at this temperature for 1 hour. Finally, the methyl isobutyl ketone and n-butanol were added to the mixture.

The resultant product comprising the blocked isocyanate crosslinking agent had a solids content of 64.8 percent.

EXAMPLE IC

The above crosslinking agent and an active hydrogen group-containing material were blended and dispersed in water to form a curable composition, in the following manner.

| Ingredients | Mass (gm) | Non-Volatiles (gm) | Equivalents | Moles |
|---|---|---|---|---|
| The above film-former | 655.2 | 420.0 | 0.376 | |
| The above crosslinking agent | 265.5 | 180.0 | | |
| Lactic acid | 15.4 | 15.4 | 0.16 | 0.16 |
| Deionized water | 762.5 | | | |

The deionized water was slowly added to a blend of the filmformer, crosslinker and lactic acid to produce an aqueous dispersion having a solids content of 44.6 percent.

EXAMPLE II

This example illustrates the crosslinking agents comprising a combination of the 1,2-polyol and conventional blocking agents, and curable compositions comprising same.

The crosslinking agent was prepared as follows.

| Ingredients | Parts by Weight (grams) |
|---|---|
| MONDUR TD80 | 246.0 |
| Trimethylolpropane | 63.2 |
| Methyl isobutyl ketone | 132.5 |
| Methyl isobutyl ketone | 49.0 |
| Hydrolyzed butyl glycidyl ether | 140.0 |
| 2-Ethylhexanol | 91.9 |
| Dibutyltin dilaurate | 0.06 |

A reaction vessel equipped with a stirrer, a thermometer, a gas inlet fitting, a condenser and an addition funnel was charged with the diisocyanate and a nitrogen blanket was begun. The trimethylolpropane was dissolved in the 132.5 grams of methyl isobutyl ketone with heating and charged to a warm addition funnel. The triol solution was added to the diisocyanate over 30 minutes while maintaining the temperature of the reaction mixture between 30° and 41° C. (with an ice bath as needed). After completion of the addition, the reaction mixture was allowed to react over a temperature range of 44° to 52° C. for 45 minutes. During this time, a second reaction vessel equipped in the same manner as described above was charged with the 49.0 grams of methyl isobutyl ketone, the hydrolyzed butyl glycidyl ether and the 2-ethylhexanol. This mixture (of blocking agents) was heated to 60° C. under a nitrogen blanket. The isocyanate-trimethylolpropane adduct solution was charged to the addition funnel and added to the mixture of blocking agents over one hour while maintaining the temperature between 61° and 67° C. About 15 minutes after the addition was complete, the dibutyltin dilaurate was added and the temperature was increased to 120° C. and held there until a sample removed and analyzed by infrared spectroscopy revealed no isocyanate peak. The resultant product, comprising the blocked isocyanate crosslinking agent, had a solids content of 73.7 percent.

An aqueous dispersion comprising the above crosslinking agent, and film-former which was the same as described in Example IB, was prepared, in the same manner as described in Example IC. The following were used.

| Ingredients | Mass (gm) | Non-Volatiles (gm) | Equivalents | Moles |
|---|---|---|---|---|
| The film-former of Example IB | 233.9 | 165.0 | 0.411 | |
| The above crosslinking agent | 599.7 | 385.0 | | |
| Lactic acid | 16.8 | | 0.16 | 0.16 |
| Deionized water | 731.0 | | | |

The resultant aqueous dispersion had a solids content of 37.9 percent.

COMPARATIVE EXAMPLE

A conventional crosslinking agent comprising a conventional blocking agent was prepared, blended with a film-former, and evaluated for its ability to cure.

The preparation was as follows.

| Ingredients | Mass (gm) | Non-Volatiles (gm) | Equivalents | Moles |
|---|---|---|---|---|
| MONDUR TD80 | 349.3 | 349.3 | 4.015 | 2.007 |
| Trimethylolpropane | 89.7 | 89.7 | 2.01 | 0.67 |
| Methyl isobutyl ketone | 188.1 | | | |
| 2-Ethylhexanol | 261.0 | 261.0 | 2.008 | 2.008 |
| Methyl isobutyl ketone | 111.9 | | | |
| Dibutyltin dilaurate | 0.06 | 0.06 | | |

A reaction vessel equipped with a stirrer, a thermometer, a gas inlet fitting, a condenser and an addition funnel was charged with the diisocyanate and a nitrogen blanket was begun. The trimethylolpropane was dissolved in the 188.1 grams of methyl isobutyl ketone with heating and charged to a warm addition funnel. The triol solution was added to the diisocyante over 30 minutes while maintaining the temperature of the reaction mixture between 38° and 41° C. (with an ice bath as needed). After completion of the addition, the reaction mixture was held over a temperature range of 44° to 55° C. for about 30 minutes. During this time, a second reaction vessel equipped in the same manner as described above was charged with the 111.9 grams of methyl isobutyl ketone and the 2-ethylhexanol. The isocyanate-trimethylolpropane adduct solution was charged to the addition funnel and added to the 2-ethylhexanol mixture over a period of about one hour while maintaining the temperature between 61° and 67° C. About 15 minutes after the addition was complete, the dibutyltin dilaurate was added and the temperature was increased to 120° C. and held there until a sample removed and analyzed by infrared spectroscopy revealed no isocyanate peak. The resultant product comprising the blocked isocyanate crosslinking agent had a solids content of 71.5 percent.

An aqueous dispersion comprising the above crosslinking agent, and a film-former which was the same as described in Example IB, was prepared in the same manner as described in Example IC. The following were used in the preparation.

| Ingredients | Mass (gm) | Non-Volatiles (gm) | Equivalents | Moles |
|---|---|---|---|---|
| The film-former | 251.7 | 180.0 | 0.449 | |
| The crosslinking agent | 654.2 | 420.0 | | |
| Lactic acid | 18.4 | | 0.18 | 0.18 |
| Deionized water | 790.0 | | | |

The resultant aqueous dispersion had a solids content of 38.6 percent.

EXAMPLE III

This example further shows the preparation of the crosslinking agents of the present invention. The following were used in the preparation.

| Ingredients | Mass (gm) | Non-Volatiles (gm) | Equivalents | Moles |
|---|---|---|---|---|
| 1,2-Butanediol | 125.0 | 125.0 | 2.774 | 1.387 |
| Methyl isobutyl ketone | 250.0 | | | |
| MONDUR TD80 | 160.9 | 160.9 | 1.849 | 0.925 |
| Dibutyltin dilaurate | 0.1 | 0.1 | | |

A reaction vessel equipped with a stirrer, a thermometer, a gas inlet fitting, a condenser, an addition funnel and a Dean-Stark trap (filled with methyl isobutyl ketone) was charged with the 1,2-butanediol and the methyl isobutyl ketone. Under a nitrogen blanket, the reaction mixture was heated to reflux for about 30 minutes. The reaction temperature having risen to 124° C. was cooled to 95° C. and the dibutyltin dilaurate was added. The reaction temperature was cooled to 90° C., followed by adding the MONDUR TD80 over a period of 45 minutes. Following this addition, the reaction mixture was heated to 110° C. and held at this temperature for about one hour until all the free isocyanate had been reacted. The resultant product comprising the blocked isocyanate had a solids content of 65.1 percent.

EXAMPLE IV

This example also shows the preparation of the crosslinking agents of the present invention in essentially the same manner as described in Example III. The following were used in the preparation.

| Ingredients | Mass (gm) | Non-Volatiles (gm) | Equivalents | Moles |
|---|---|---|---|---|
| Propylene glycol | 228.0 | 228.0 | 6.000 | 3.000 |
| Methyl isobutyl ketone | 246.9 | | | |
| MONDUR TD80 | 348.0 | 348.0 | 4.000 | 2.000 |
| Dibutyltin dilaurate | 0.1 | 0.1 | | |

The resultant product comprising the crosslinking agent had a solids content of 77.2 percent.

EXAMPLE V

This example shows the preparation of the crosslinking agents comprising 1,2-polyol blocking agents in essentially the same manner as described in Example III. The following were used in the preparation:

| Ingredients | Mass (gm) | Non-Volatiles (gm) | Equivalents | Moles |
| --- | --- | --- | --- | --- |
| Ethylene glycol | 93.0 | 93.0 | 3.00 | 1.50 |
| MONDUR TD80 | 174.0 | 174.0 | 2.000 | 1.000 |
| Ethylene glycol monoethyl ether monoacetate | 100.0 | | | |
| Dibutyltin dilaurate | 0.04 | 0.04 | | |

The resultant product comprising the crosslinking agent had a solids content of 72.7 percent.

EXAMPLE VI

Coating compositions of Examples I, II and the Comparative Example were formulated with dibutyltin oxide cure catalyst at 0.33 percent tin metal based on total solids weight of the composition. The formulation comprised preparing a paste of the catalyst by grinding the catalyst with a resinous grinding vehicle to about a Hegman 7 grind. U.S. Pat. No. 4,007,154 (note Example II) discloses the grinding vehicle in nature and method of preparation and is incorporated herein by reference. The resulting paste comprises 30 percent dibutyltin oxide, 12 percent grinding vehicle and the remainder solvent. The paste was mixed thoroughly with the coating compositions and the resulting dispersions were stirred at room temperature for three days to permit the methyl isobutyl ketone and n-butanol to escape.

Panels of substrates were electrocoated at about 100 volts for one minute at a bath temperature of 75° F. (22° C.) in aqueous dispersions of the above coatings at 15 percent resin solids, baked and evaluated to determine degree of cure at varying temperatures. The degree of cure was measured by the number of acetone double rubs required to remove the baked film.

The condition of the evaluation and the results obtained were as reported below.

| Double Acetone Rubs After 30 Minutes Bake On Bonderite 40 Zinc Phosphate Pretreated Steel Panels | | | | |
| --- | --- | --- | --- | --- |
| | 275° F. | 300° F. | 325° F. | 350° F. |
| Coatings of the Comparative Example | — | — | — | >100 |
| Coatings of Example II | — | 10 | 25 | >100 |
| Coatings of Example I | 5 | 25 | 65 | — |

What is claimed is:

1. A process for providing a protective or decorative coating for a substrate, comprising:
   (1) applying to the substrate an aqueous coating composition consisting essentially of
      (a) a beta-hydroxy urethane crosslinking agent which is a reaction product of an isocyanate and a 1,2-polyol wherein the equivalent ratio of —NCO groups of the isocyanate to —OH groups of the 1,2-polyol is about 1:1.5 to 1:2,
      (b) a cure catalyst, and
      (c) an active hydrogen-containing material to form a curable coating on the substrate; said beta-hydroxy urethane being present in an amount sufficient to cure the coating at elevated temperature.

2. A method of electrocoating an electrically conductive surface serving as a cathode in an electrical circuit comprising said cathode, an anode and an aqueous electrodepositable coating composition, by passing an electric current between said anode and said cathode to form a curable coating on the cathode, wherein the aqueous electrodepositable composition comprises an aqueous dispersion of:
   (a) a beta-hydroxy urethane crosslinking agent which is a reaction product of an isocyanate and a 1,2-polyol wherein the equivalent ratio of —NCO groups of the isocyanate to —OH groups of the 1,2-polyol is about 1:1.5 to 1:2,
   (b) a cure catalyst, and
   (c) an active hydrogen-containing material
said beta-hydroxy urethane being present in an amount sufficient to cure the coating at elevated temperature.

3. A method as recited in claim 1, followed by baking the coated substrate at a temperature of about 275° F. to 325° F. to cure the coating.

4. A method as recited in claim 2, followed by baking the coated substrate at a temperature of about 275° F. to 325° F. to cure the coating.

* * * * *